R. S. PEIRCE.
METHOD OF ANCHORING THREADED ELEMENTS.
APPLICATION FILED SEPT. 17, 1913.

1,147,045.

Patented July 20, 1915.

Witnesses:
Jno. A. Nelson Jr.
Edwin B. Nelson

Inventor:
Ralph S. Peirce.
By
Atty.

UNITED STATES PATENT OFFICE.

RALPH S. PEIRCE, OF HINSDALE, ILLINOIS.

METHOD OF ANCHORING THREADED ELEMENTS.

1,147,045.

Specification of Letters Patent.

Patented July 20, 1915.

Application filed September 17, 1913. Serial No. 790,309.

*To all whom it may concern:*

Be it known that I, RALPH S. PEIRCE, a citizen of the United States, residing at Hinsdale, in the county of Du Page and State of Illinois, have invented a certain new and useful Improvement in Methods of Anchoring Threaded Elements, of which the following is a full, clear, concise, and exact description, reference being had to the accompanying drawings, forming a part of this specification.

My invention relates to a method of anchoring threaded elements in position and is of service where fastening screws or anchoring bolts are to be held in walls or other supporting bodies.

Generally speaking, my new method consists in forming a recess in the body in which the threaded element is to be anchored, inserting a soft metal hollow cylinder in said recess, expanding the cylinder, while within said recess, into tight engagement with said body, and thereafter screwing the threaded element into the bore of the cylinder.

In the preferred way of practising the invention the expansion of the cylinder is effected along spaced apart longitudinal lines and the metal between these lines is inwardly crowded to contract the bore of the cylinder to afford insetting longitudinal ridges or ribs into which the threads of the screw enter as the screw is turned, the clearances between these ribs receiving the metal dislodged from said ribs by the screw. Thus the screw need not be relied upon (as it was hitherto) sufficiently to expand the soft metal cylinder to effect the tight anchorage of the cylinder, this function being performed by a punch that has greater capacity than the screw for performing this work. The screw itself need only serve to thread its way into the insetting ribs whereby the screw and soft metal cylinder are brought in threaded engagement to prevent the sliding withdrawal of the screw from the cylinder that has been very firmly anchored independently of the screw. In the prior practice the screw would often be ineffective sufficiently to expand the cylinder, particularly if the recess receiving the cylinder were large.

I will explain my invention more fully by reference to the accompanying drawing illustrating one way of practising the same and in which—

Figure 1:
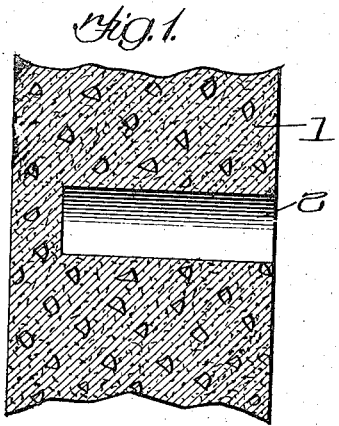
Figure 2:
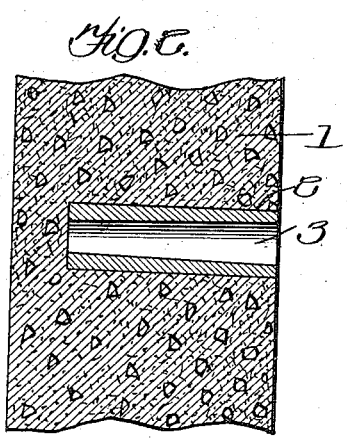
Figure 3:
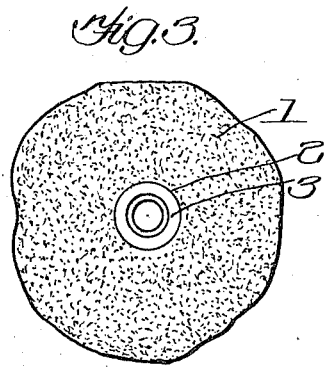
Figure 4:
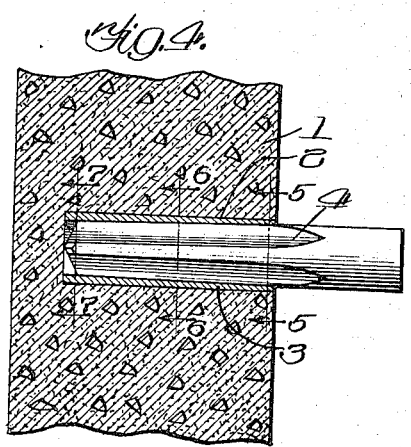
Figures 5, 6, 7:
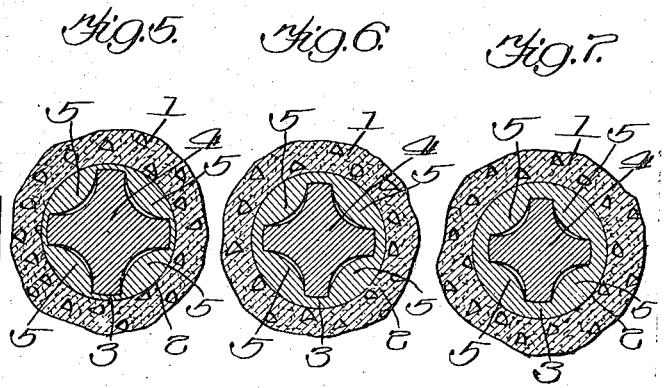
Figure 8:
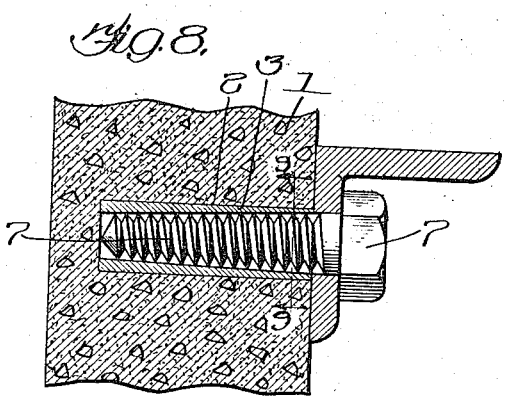
Figure 9:
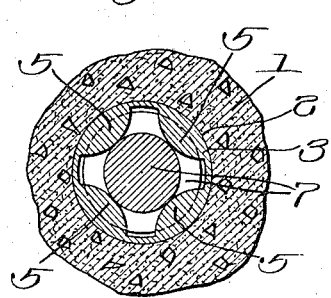

Figure 1 shows a recess formed in a wall; Fig. 2 illustrates a soft metal hollow cylinder inserted in the recess shown in Fig. 1; Fig. 3 is a front view of the parts shown in Fig. 2; Fig. 4 shows a punch driven within the cylinder shown in Figs. 2 and 3; Figs. 5, 6 and 7 are sectional views respectively taken on lines 5 5, 6 6, and 7 7 of Fig. 4, but on a larger scale; Fig. 8 shows a threaded element within the bore of the soft metal cylinder; and Fig. 9 is a sectional view on line 9 9 of Fig. 8, but on a larger scale.

Like parts are indicated by similar characters of reference throughout the different figures.

The screw supporting body is illustrated as being in the form of a concrete wall 1, in which a screw receiving recess 2 is formed by any suitable means. A hollow cylinder 3, closely approximating the diameter of the recess but sliding freely therein, is inserted. This cylinder preferably has a bore which tapers inwardly. A punch 4, tapering correspondingly to the core of the cylinder, is driven into the bore of the cylinder. This punch is preferably longitudinally fluted so as to be cross shaped in cross section whereby the wall of the cylinder is made thin along four longitudinal lines where the greatest cylinder expansion occurs and where the cylinder is forced into its tightest engagement with the wall 1. Obviously expansion also occurs between these four longitudinal lines, the soft metal of the cylinder (which is preferably made of lead) also flowing inwardly as indicated at 5 to contract the bore of the cylinder and to form longitudinal ribs into which the threads of the screw 7 find their way as this screw is turned, the soft metal displaced by the screw threads falling into the spaces between the ribs. Thus by means of my invention, the soft metal cylinder is tightly forced in place by means (such as a punch) much better able to perform this function than the screw, and the screw is tightly held in place by the formation of the ribs at 5 effected by the punch.

The advantages of the method of my invention will, it is thought, be fully appreciated by those skilled in the art.

I claim:

1. The method of anchoring a threaded element which consists in forming a recess in the body in which the threaded element is to be anchored; inserting a soft hollow metal cylinder in said recess; expanding the cylinder along spaced apart lines extending longitudinally of the cylinder within said recess into tight engagement with said body and also inwardly bulging said cylinder along spaced apart lines extending longitudinally of the cylinder within said recess; and thereafter screwing the threaded element into the bore of the cylinder.

2. The method of anchoring a threaded element which consists in forming a recess in the body in which the threaded element is to be anchored; inserting a soft hollow metal cylinder in said recess; expanding the cylinder along spaced apart lines extending longitudinally of the cylinder within said recess into tight engagement with said body and also inwardly bulging said cylinder within said recess; and thereafter screwing the threaded element into the bore of the cylinder.

3. The method of anchoring a threaded element which consists in forming a recess in the body in which the threaded element is to be anchored; inserting a soft hollow metal cylinder in said recess; expanding the cylinder within said recess into tight engagement with said body and also inwardly bulging said cylinder along spaced apart lines extending longitudinally of the cylinder within said recess; and thereafter screwing the threaded element into the bore of the cylinder.

4. The method of anchoring a threaded element which consists in forming a recess in the body in which the threaded element is to be anchored; inserting a soft hollow metal cylinder in said recess; expanding the cylinder within said recess into tight engagement with said body and also inwardly bulging the bore of said cylinder within said recess; and thereafter screwing the threaded element into the bore of the cylinder while inwardly bulged.

5. The method of anchoring a threaded element which consists in forming a recess in the body in which the threaded element is to be anchored; inserting a soft metal hollow cylinder in said recess; expanding the cylinder throughout its length within said recess into tight engagement with said body; and thereafter screwing the threaded element into the bore of the cylinder.

6. The method of anchoring a threaded element which consists in forming a recess in the body in which the threaded element is to be anchored; inserting a hollow body of soft material in said recess; expanding said hollow body throughout its length within the recess into tight engagement with said body; and thereafter screwing the threaded element into the hollow space of said body.

7. The method of anchoring a threaded element which consists in forming a recess in the body in which the threaded element is to be anchored; inserting a hollow body of soft material in said recess; expanding said hollow body within the recess into tight engagement with said body and contracting at intervals the hollow space of said body; and thereafter screwing the threaded element into the hollow space of said body.

In witness whereof, I hereunto subscribe my name this twenty-ninth day of July, A. D., 1913.

RALPH S. PEIRCE.

Witnesses:
G. L. CRAGG,
C. L. PEIRCE.